United States Patent
Liu et al.

[15] 3,680,698
[45] Aug. 1, 1972

[54] PROCESS FOR THE TREATMENT OF SLIMES AND WASTE SOLIDS

[72] Inventors: Tung Liu, Claremont; David R. Stern, Fullerton, both of Calif.

[73] Assignee: Occidental Petroleum Corporation

[22] Filed: Feb. 25, 1970

[21] Appl. No.: 14,162

[52] U.S. Cl. ........................................210/46, 210/73
[51] Int. Cl. ..................................................C02b 1/20
[58] Field of Search ..........................210/49, 51–54, 210/10, 73, 47, 46, 75; 260/89.7

[56] References Cited

UNITED STATES PATENTS

| | | | |
|---|---|---|---|
| 2,947,418 | 8/1960 | Gooch et al. | 210/10 X |
| 3,480,761 | 11/1969 | Kolodny et al. | 210/54 |
| 2,381,514 | 8/1945 | Phelps | 210/51 X |
| 2,108,168 | 2/1938 | Jenks | 210/75 X |
| 3,320,136 | 5/1967 | Zajic | 210/54 X |

FOREIGN PATENTS OR APPLICATIONS

| | | | |
|---|---|---|---|
| 816,575 | 7/1959 | Great Britain | 260/89.7 |

*Primary Examiner*—Michael Rogers
*Attorney*—Christie, Parker & Hale

[57] ABSTRACT

Fine solids contained in liquids are more effectively compacted to a handleable state by the addition of a liquid coagulant reaction mass to flocculate the solids followed by settling the flocculated solids with slow agitation to compact the solids and form a clarified liquid. Additional liquid may then be extracted from the compacted solids by slowly agitating the solids while in contact with a sand filter. Alternatively, the addition of sand to the flocculated solids results in the formation of a homogeneous, highly porous aggregate which rapidly compacts, without agitation, to a high solids density.

27 Claims, 2 Drawing Figures

PROCESS FOR THE TREATMENT OF SLIMES AND WASTE SOLIDS

BACKGROUND OF THE INVENTION

The present invention relates to the settling and thickening solid matter contained in a liquid, such as slimes, wastes, pulps and the like for recovery or disposal of the solid matter.

Slimes, for example, have been to the mining industry an aqueous suspension of fine particles that are difficult to dewater. Slimes typical to the phosphate industry appear as a waste from a beneficiation plant at a solids concentration of from about 0.5 to 5 percent. These slimes generally contain particles finer than about 150 mesh and are often as rich as the original mined matrix. They are uneconomical to process with present technology and as a result, about a quarter to a third of the ore values are lost.

Normally about 1,000 and 2,500 pounds are produced per ton of finished ore processed. Since water has been added, slime volume exceeds the volume of the matrix mined. Consequently, the volume required to store the slimes is greater than the mined out area. To contain the slimes, earthen dikes are built around a mined out area for long term storage.

Slimes have been accumulated almost since the inception of the phosphate industry, some 50 years ago. They have remained in suspension at a solids concentration usually less than 30 percent. The land has not been recoverable, remains blighted and blighted areas are constantly growing in size and number. The earthen dikes constructed to contain the slimes are costly and difficult to maintain, often breaking and causing serious stream pollution problems. Similar problems exist in other mining industries, such as the potash industry where slimes produced are also difficult to settle and practically impossible to filter.

Both government and industry have long been concerned with this problem. The problems of dealing with slimes has, for instance, been reported in articles, such as "Phosphatic Slime, a Potential Mineral Asset", Tyler and Waggaman, Industrial and Engineering Chemistry, Vol. 46, No. 5, Page 1049, May 1954; "Phosphate Wastes", by J.L. Cox. Proceeding of the Symposium on Mineral Waste Utilization, March 27-28, 1968, Chicago, Illinois, pp. 50–61, and in Bureau of Mines information circular 8404, titled, "Waste Disposal Costs of a Florida Phosphate Operation", (1969).

Most recently, a paper titled "Building Land with Phosphate Slimes", R.C. Timberlake (Nov. 3, 1969) presented to the Florida Section of the AIME discussed limited land reclamation by the addition of sand to a phosphate slime. It was reported, however, that the sand disassociated from the solids (clay) in the slime and settled preferentially. This required an excessive addition of sand to achieve compaction to a desired level.

While these reports do consider the truly meaningful efforts which have been made to treat slimes for recovery of values or just dewater them, the consensus remains that technologically, full treatment is still not feasible. Accordingly, industry remains burdened with the storage of slimes in evergrowing ponds and diked areas with no practical means to dispose of them.

SUMMARY OF THE INVENTION

It has been found that solids suspended in a liquid, such as slimes and wastes, can be more effectively compacted to a handleable state for recovery or disposal of the solid matter by the steps of adding to the liquid containing suspended fine solids, a directly prepared liquid coagulant reaction mass with agitation, preferably high shear agitation, in at least one stage to flocculate the solids; settling the flocculated solids, with slow agitation, to form at least a partially compacted solids mass and a clarified liquid; then separating the clarified liquid from the partially compacted solids.

Where desired, additional liquid may be extracted from the partially compacted solids by slowly agitating the partially compacted solids in contact with a porous filter, preferably sand. Agitation of the partially compacted solids while in contact with the porous filter materially improves the rate of flow of liquid through the porous filter and can promote the formation of a clarified overflow for removal by decantation.

The addition of sand to the solids which have compacted to a solids concentration of at least 10 percent by weight, results in the formation of a fairly homogeneous mixture of solids and sand bound to some degree by the coagulant. This mixture is highly porous and rapidly releases retained liquid. The resultant dewatered mixture is also porous which allows land reclamation without at least the initial formation of impervious clay strata.

It has also been found that gypsum may be added with the coagulant reaction mass to promote flocculation and that aging a fresh liquid containing suspended solids will reduce the amount of coagulant required to settle the solids. Economy is also favored by the addition of the liquid coagulant reaction mass in several stages.

Solids suspended in liquids, such as slimes and wastes, when treated in accordance with the practice of this invention, can be economically and effectively settled for recovery or disposal within a matter of days.

DRAWING

DESCRIPTION

According to the present invention, solids suspended in a liquid, particularly an aqueous suspension, such as slimes, wastes, pulps and the like, are compacted to a handleable state by the addition, with agitation, to the liquid suspension of a liquid coagulant reaction mass to flocculate the solids, then employing slow agitation to settle the flocculated solids to form at least a partially compacted solids mass and a clarified liquid. Where desired, additional clarified liquid may be extracted from the compacted solids by agitating the compacted solids while in contact with a porous filter media, such as sand.

Once the solids have compacted to a concentration of at least 10 percent solids, sand may be added to the system and there may be formed a homogeneous mixture of solids and sand which will rapidly compact, without disassociation to a high solids density. This mixture will dry to a highly porous state which allows land reclamation with the formation of a clay strata.

Depending on the system being treated, processing may also be carried out in conjunction with the additional steps of adding the liquid coagulant reaction mass in a plurality of stages, with intermediate settling; aging the suspension prior to coagulant addition, and adding gypsum with the coagulant to promote rapid flocculation. Adding the coagulant reaction mass with high shear agitation has also been found to facilitate floccule formation and rapid settling.

The process of this invention is applicable for the treatment of any liquid containing suspended solid matter and, as will be appreciated, is particularly useful for settling solids which by themselves show little or no tendency to settle from their liquid carriers. This is particularly true of aqueous suspensions such as slimes and wastes.

Figure 1:
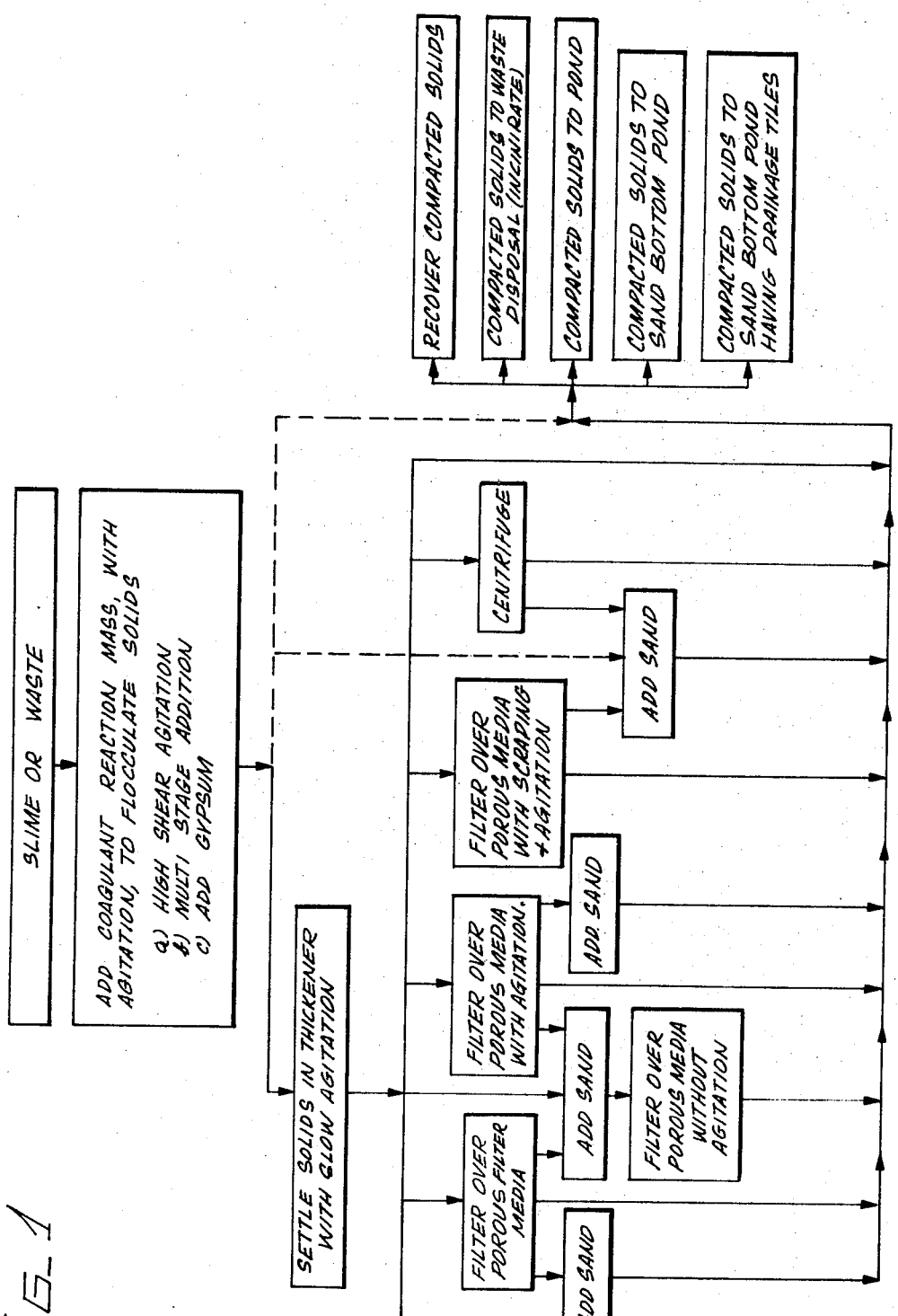
FIG. 1 is a summary of the various processing stages through which solids may pass through when a liquid containing suspended solids is processed in accordance with the practice of this invention.

With reference now to FIG. 1, the first step in the practice of the process of this invention is the addition, with agitation, of a compatible liquid coagulant reaction mass to the liquid containing suspended solids. By the term "liquid coagulant reaction mass" there is meant a system comprising a liquid and a coagulant formed in situ in the liquid as a consequence of a chemical and/or biological action. Chemical or biological action may create the coagulant behavior or improve, by reactive action, the behavior of a coagulant of limited activity. The liquid coagulant reaction mass, thus formed, is used, as such, without recovery of the active coagulant.

This is most important. Isolation of the coagulant has been found to increase cost of preparation and diminish activity. Additionally, preparing the liquid coagulant reaction mass for the suspension to be treated allows the properties of the active coagulant to be tailored to the nature of the solids to be flocculated.

The liquid coagulant reaction mass may be obtained in a number of ways. Conveniently, it may be obtained by the polymerization of monomers of a polymeric coagulant in the presence of a suitable catalyst in a liquid compatible with the suspension to be treated.

An example of such polymeric coagulants are the polyelectrolytes which may be prepared by the direct vinyl polymerization in an aqueous media of a polymerizable amount of at least one unsaturated monomer in the presence of a suitable polymerization catalyst therefore.

Illustrative, but no wise limiting, of the monomers, which serve as basic building blocks for the synthesis of polymeric coagulants in an aqueous media there may be mentioned acrylamide and its hydrolysis derivatives; acrylic acid; methacrylamide and its hydrolysis derivatives; methacrylic acid; ethyleneimine; 2 ethylethyleneimine, propyleneimine, ethylene oxide; hydroxy ethyl methacrylate; vinyl sulfonic acid, vinyl carboxamide sulfates maleic anhydride and the like. Vinyl carboxamide sulfate polymers are particularly preferred because of their high effectiveness and low cost of preparation.

The liquid coagulant reaction mass may also be conveniently prepared by reactive modification of starches, gums, carbohydrates and the like which undergo chemical or biological change in a liquid which is compatible with the suspension system being treated.

The liquid in which the coagulant is formed will vary depending on the nature of the suspension to be treated. As most liquid suspensions are aqueous in nature, the coagulant is preferably prepared in an aqueous media.

Expeditiously, the coagulant reaction mass can be synthesized at the physical location where flocculation is to occur. It is also feasible to prepare the liquid coagulant reaction mass at a site common to a number of treating operations. This affords the particular advantage of allowing batchwise custom control over reaction conditions employed in the preparation of the coagulant to tailor its characteristics to the solids to be treated. In addition, the coagulant may be used when freshly made. This avoids age degradation and the unquestionable loss in effectiveness which occurs when the coagulant is recovered as a solid for subsequent use as a flocculant. More importantly, the coagulant reaction mass can be prepared at a fraction of the cost of conventional solid flocculants and, as a consequence, can be used to economically compact solids for recovery or disposal in operations where treatment is not presently economical.

As indicated, the liquid coagulant reaction mass is added to the suspension with agitation. For most suspensions, it has been found that a multi stage addition of a given quantity of coagulant to a fluid media results in more floccule formation per part coagulant. Agitation is particularly important to obtain complete and effective contact of coagulant with the solids and aids in the formation of floccules of a size large enough to rapidly settle from the fluid. For many liquid suspensions, high shear agitation during addition of the coagulant reaction mass has been found to be most effective in initiating the formation of floccules which settle at a rapid rate.

Where multi stage addition of the coagulant reaction mass is employed, the partially coagulated solids are normally allowed to age, preferably with slow agitation, to allow an initial mass of floccules to form and settle. Aging time between coagulant additions is not narrowly critical and may take place over a day or less.

The total amount of coagulant reaction mass added to the suspension will vary depending on the nature of the system being treated. Generally, however, amounts used should range from about 10 to about 1,000, preferably from about 50 to about 800 and more, preferably from about 100 to about 500 parts per million parts of contained particulate solid matter. It has also been observed that greater amounts will cause flocculation but may retard both the rate and degree of solids compaction. In some instances, rate of compaction will be less than an untreated suspension.

For certain suspensions, particularly phosphate slimes, the addition of a minor amount of gypsum with the flocculant synergistically promotes flocculation rate. Gypsum is normally added in an amount of from solution saturation up to 1 percent by weight, or more, in excess of solution saturation.

Following addition of the liquid coagulant reaction to the fluid media to flocculate the solids, the nucleated floccules may be passed to any settling area such as a pond. More expeditiously, however, at least an initial compaction is achieved by slowly agitating the resultant system to form at least partially compacted solids and a clarified liquid. Agitation should be within the mass of the nucleated floccules and may be conveniently carried out, as will be shown, in a thickener equipped with a rake agitator. Operation should be below an agitator blade tip velocity of about 30 feet per minute. While it would normally be expected that agitation will redisperse the floccules and retard settling, it has been particularly noted that slow agitation actually enhances settling. Slow agitation, it appears, helps the floccules to align as they compact to yield a denser mass and provides channels within the settling solids mass which promotes percolation of a clarified liquid upwards through the compacting solids mass.

Rate of agitation should, however, be generally decreased with increased solids compaction. It has been observed that at a given agitation rate redispersion of the floccules can occur once they have compacted to some solids density. Reducing or discontinuance of agitation overcomes this phenomenon and allows a high degree of compaction.

Once the solids have compacted to a handleable state they may be separated from the clarified liquid, discarded or further processed to reclaim the contained values.

For most systems, however, further compaction will be desired. Centrifugation may be conveniently employed, for instance, when the volume of the solids is small or a high degree of compaction is desired.

For most systems, however, additional compaction may be more readily and economically achieved by passing the initially compacted solids to a porous filter bed having good drainage such as a sand filter.

Alternatively, and where it is simply desired to recover the land, as in the case of phosphate slimes, the compacted solids may be conveniently passed to a pond, preferably a pond having a sand bottom, and more preferably, equipped with drainage tiles to facilitate rapid dewatering of the slime so that within a short period of time the land may be recovered for use.

In either instance, since the solid matter exists as floccules through which the liquid will rapidly pass, the solid matter will quickly compact to a high solids content, generally in the order of 30 percent of more, depending on the nature of the system being processed.

When a porous filter bed is employed, compaction to a high solids content is preferably achieved by slowly agitating the compacting solids while in contact with the filter bed. This prevents plugging of the filter media allowing a rapid flow of liquid downward through the filter bed. In addition, it creates channels within the compacted mass which allows additional liquid to form as a clarified overflow for removal by decantation and the like.

For some systems, such as industrial wastes and where recovery of the compacted solids is desired, agitation is accompanied by a scraping of the surface of the filter bed. This may be conveniently accomplished, for instance, by arranging the filter bed in a rectangular fashion and providing a rake agitator having a scraping blade which slowly traverses the bed in cyclic fashion. The rakes of the agitator pass through the mass of the compacting solids to promote channeling and the formation of liquid overflow. Simultaneously, the scraping blade passes over the surface of the bed to force the solids which have compacted to a recovery zone and clean the bed surface to prevent plugging. This technique allows the compaction of the solids to an extremely high level. Raw sewage, for instance, may be processed in this manner for economic disposal of solids and liquid purification. Where solids have value they are compacted to a level where transport to leaching operations and the like is feasible.

When a high solids density is desired, sand may be admixed with the compacting or compacted solids. It has been most unexpectedly found that when sand, usually as a slurry with a compatible liquid, is mixed with flocculated solids which have compacted to a solids density of 10 percent of more, there is formed a homogeneous blend of the solids and sand which will rapidly compact to an extremely high solids density. Solids densities of up to 60 percent solids or more, exclusive of the sand, may be readily achieved. In addition, compaction occurs without disassociation of the sand from the flocculated solids in that the coagulant appears to bind the sand and flocculated solids.

The point at which sand is added to the system may vary widely. Sand, for instance, may be added as soon as flocculation occurs so long as, as previously indicated, solids density has reached 10 percent by weight solids. For most situations, however, sand will be added after an initial settling in a thickener and before the flocculated solids are passed to a porous filter, pond or other recovery operation. Sand may also, where desired, be mixed with a solids effluent from a porous filter just before the solids are passed to a next processing stage.

Where sand is added to the solids passing from a thickener to a porous filter, or added directly to the porous filter where agitation has been taking place, it is preferred to discontinue agitation once the sand is uniformly blended with the flocculated solids. It has been found that, where sand is present, further agitation does not materially contribute to high compaction. One reason is that this homogeneous aggregate is highly porous and by nature will rapidly loose entrained liquid. This phenomenon is quite important in the situation where it is desired to recover the land. Independent of the point at which sand is added to the system, once compaction to a desirable state has occurred, the resultant aggregate may be conveyed to a settling pond where the mixture will deposit out as a homogeneous blend and provide a clarified liquid overflow. The aggregate, when dry, has been observed to be highly porous. This provides reclaimed land having good drainage characteristics and is void of clay strata which could hamper drainage.

Since the aggregate shows an excellent tendency to compact and release entrained liquid, the pond should have a sand bottom to further promote good drainage and a formation of reclaimed land having excellent drainage potential. More rapid drainage is possible where the sand bottom pond is equipped with drainage tiles. For an aqueous slime, this allows the clarified water to be channeled to a recovery area for use in irrigation and the like.

The amount of sand which may be incorporated in the compacted flocculated solids may vary widely. Generally, amounts of from about 50 to 150 percent, or more, based on the weight of the flocculated solids may be added. In the instance of land reclamation. This provides an ideal opportunity to dispose of all of the tailing sands from a mining operation. This also allows slimes in existing ponds of mined out areas to be rapidly processed for land recovery and elimination of blights which have existed for many years.

The porosity of the aggregate may also be put to advantageous use where product recovery is desired. In case of phosphate slimes, for instance, the presence of sand allows the formation of a highly porous mixture which can be readily leached for its phosphate values as $P_2O_5$. In some instances leaching would be difficult because the values may tend to form as a clay-like cake. Although the use of the coagulant reaction mass promotes the formation of porous compacted solids, where greater porosity is desired or where the slime is most difficult to handle, sand provides a convenient route to form a mixture of high porosity which is most amenable to further processing for recovery of ore values.

Figure 2:
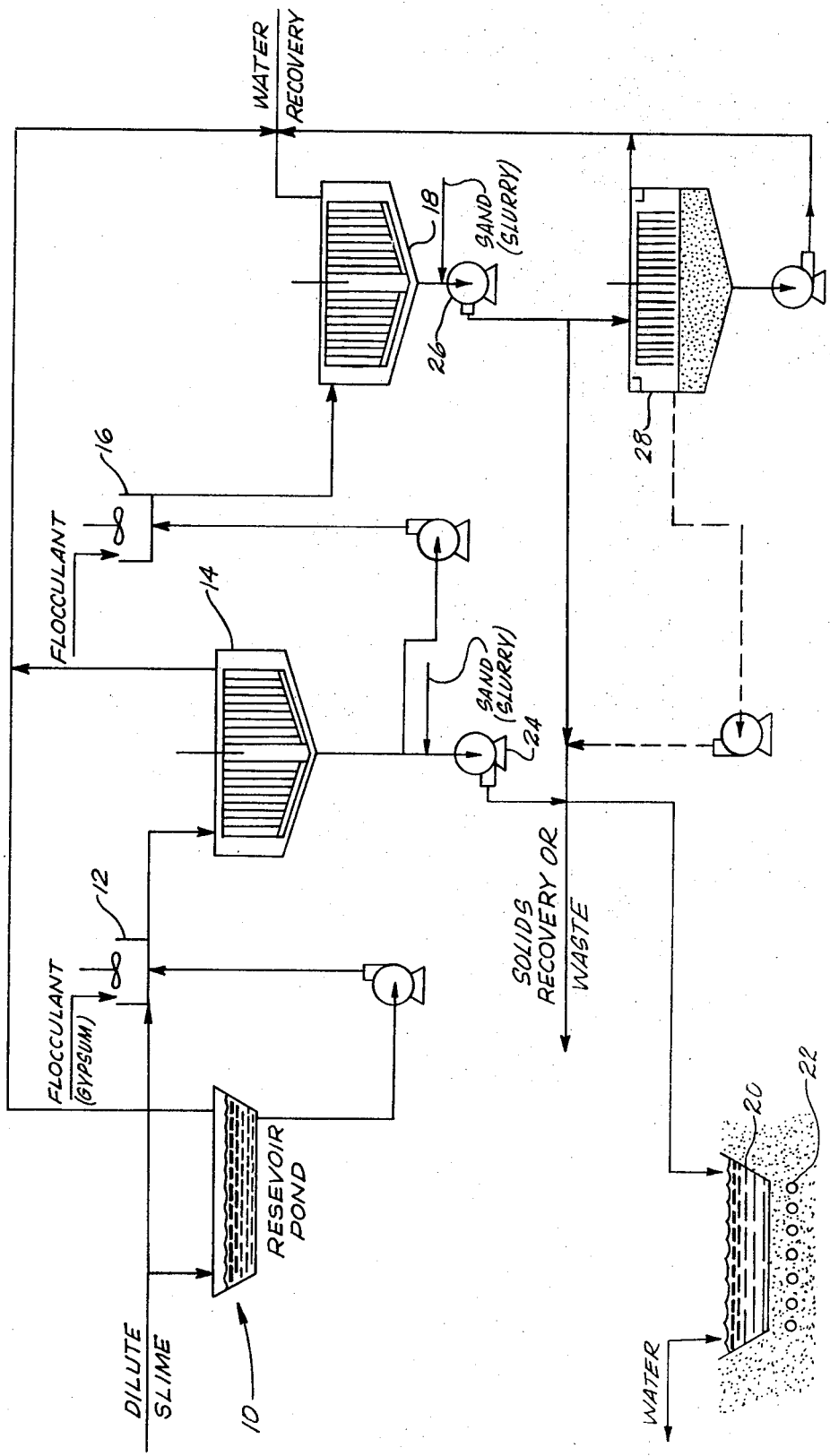
FIG. 2 is an illustration of one system which may be used for processing a liquid containing suspended solids in accordance with the practice of this invention.

A system for rapidly processing slimes, or wastes, whether fresh or in existing ponds, in accordance with the practice of this invention is illustrated in FIG. 2.

For illustrative purposes, the operation of this system may be discussed in terms of treating a phosphate slime. Fresh slimes are fed to pond 10 which serves as a reservoir and where the solids in the slime may be allowed to age for partial agglomeration. Pond 10 is tapped at the bottom for periodic or continuous slime withdrawal for passage to flocculator 12 and at the top for removal of clarified water which is, in turn, passed to a water recovery system. When older slimes are processed, pond 10 may be bypassed and the slimes pumped directly to flocculator 12. The liquid coagulant reaction mass is mixed with slime with high agitation, and preferably high shear agitation, in flocculator 12. The flocculated slime is then passed to thickeners 14 where the floccules are allowed to form with slow agitation. The flocculated solids are allowed to reside in the thickeners 14 until they settle to a solid concentration in the order of about 10 to about 20 percent solids. Clarified water which forms is continuously decanted for recovery. Total residence time to achieve this desired solids concentration is usually only in the order of a day or two.

Where desired, gypsum may be added to the processed slime along with coagulant reaction mass in flocculator 12. As indicated, gypsum when present in an amount of from saturation to about 1 percent in excess of saturation synergistically promotes the action of the coagulant to achieve rapid floccule formation and after settling.

After initial settling, the handleable solids may then be passed directly to a recovery operation or a settling pond for long term settling to a high solids mass and land reclamation.

Where compact settling is desired, however, the handleable solids are normally pumped to at least one additional flocculator 16 where additional coagulant reaction mass is added, with agitation. The resultant mixture is then sent to thickener 18 where the solids are allowed to further compact, with slow agitation, to a higher solids content, generally from about 22 to about 30 percent solids. Residence time in the thickener is usually no more than a day. The concentrated solids slurry may then be passed to a recovery zone, a mined out area, an earthen pond, a sand bottom pond, or a sand bottom pond 20 equipped with tiles 22.

Where sand mixing is desired to achieve high solids compaction, as in the case where land reclamation is sought, the effluent from thickener 14 or thickener 18 may be mixed with a sand slurry in pump 24 or 26 before passage to the pond.

In the alternative, where it is desired to achieve a still more rapid concentration of the solids, the slurry from thickener 18 is passed, with or without added sand, to a porous filter bed 28.

Where sand is not added, the slurry, as previously indicated, is allowed to dewater with slow agitation, the water draining through the sand and forming as a clarified overflow. The extracted water is passed to a water recovery system. Agitation is not employed if sand is added to the compacted solids as the mixture from pump 26 will be homogeneous and will rapidly release water through bed 28 and as a clarified overflow. Residence time in filter bed 28 is normally in the order of a day or two, depending on particle size of the solids, the nature of the filter being used and whether sand is added. Porous filter medias which may be used are sand, carbon, gravel, tailing sand and the like, with sand or tailing sand being preferred.

The more concentrated solids in filter 28 may be pumped to a recovery operation or as previously indicated, to a settling pond 20.

Where filter 28 is equipped with a scraping blade (not shown), the compacted solids may be readily scraped from the surface of the filter to a conveyor for transport to a processing operation for recovery of phosphate values as $P_2O_5$ or to a storage pond for settling over a period of time.

In using the system shown in FIG. 2, it is feasible to achieve separation of solids from liquid such as slimes and wastes in a matter of a week or less from a suspension where sedimentation might not occur even after 50 years of standing.

While the process of this invention has been described generally in terms of the compaction and recovery of phosphate values from aqueous slimes which allows the formation of values, such as $P_2O_5$ by leaching, the process is equally useful in the compaction and recovery of other minerals such as uranium and potash values.

Sewage and industrial wastes, such as metal hydroxides, may also be readily processed to extract solids contained in liquids. It may also be used for settling or organic matter, such as algae, pulps, clarification of beverages, such as beer and the like, and other liquids containing particles too fine for natural sedimentation. Water may also be purified. Algae, it has been particularly noted may be compacted for disposal without leaving a residue in the water or clinging to the sides of the sedimentation vessel.

While no wise limiting, the following examples are illustrative of the practice of the present invention.

EXAMPLE 1

To determine the effect of using a directly synthesized polyelectrolyte reaction mass as compared to commercial solid coagulants a phosphate slime containing about 8 percent solids was observed for its settling properties without the use of a flocculant and with the addition of 0.20 percent by weight of a commercial polyacrylamide coagulant, based on the total weight of the solids and an equivalent amount of an aqueous polymerized acrylamide sulfate reaction mass. Three samples were prepared and the volumes occupied by the settled solids observed at periods of time. The results are shown in Table 1.

TABLE 1

| | Vol. of suspension (ml) | | | | | | Final Settled Solids (Wt.%) Natural | Centrifuged |
|---|---|---|---|---|---|---|---|---|
| Time (Hrs.) | 0 | 1/6 | ½ | 1 | 3 | 24 | | |
| Flocculant | | | | | | | | |
| None | 100 | 96 | 87 | 81 | 69 | 51 | 8.9 | 18.8 |
| Solid Acrylamide Polymer | 100 | 44 | 42 | 42 | 41 | 41 | 10.8 | 25.0 |
| Aqueous Polyacrylamide Sulfate | 100 | 36 | 35 | 35 | 35 | — | 12.5 | 40.0 |

It was observed that compaction using the aqueous polyacrylamide sulfate reaction mass was greater and more rapid and that in the centrifugation step substantially greater than the unconditioned slime and the slime conditioned with the commercial polyacrylamide.

EXAMPLE 2

Using a polyelectrolyte obtained by polymerizing a monomeric system containing predominantly acrylamide sulfate, using a potassium bisulfate polymerization catalyst, stagewise flocculation was studied. Three samples were prepared, each containing about 8 percent by weight phosphate slime solids. One of the samples served as the control and flocculant was added in differing amounts to each of the remaining samples A and B with slow agitation. The degree of concentration of the solids was observed at the end of one-half hour after the first addition of flocculant, one-half hour after the second addition of flocculant and 20 hours after the third addition of flocculant the control was compared after 24 hours standing. The results are shown in Table II.

TABLE II

Stagewise Addition of Flocculant (Slow Agitation)

| Amt. Flocculant PPM/part solids | Time (Hrs.) | Solids Concentration (Wt. %) | | |
|---|---|---|---|---|
| | | Sample A | Sample B | Control |
| 0 | 24.0 | — | — | 8.9 |
| 160 | 0.5 | 14.8 | 15.7 | |
| 320 | 0.5 | 18.8 | 20.3 | |
| 500 | 20.0 | 25.3 | 25.3 | |

EXAMPLE 3

To illustrate the effect of sand dewatering, a polymeric acrylamide sulfate, prepared in accordance with Example 2, was added to a phosphate slime containing approximately 5 percent solids with slow agitation in an amount equivalent to 50 parts per million parts solids. The mixture was then added to a bed containing fine sand and allowed to dewater. The results are shown in Table III where it was observed that a nine fold concentration in 2 days is a most unexpected and rapid sedimentation.

TABLE III

| Aqueous Polyelectrolye System | Feed Conc. Wt.%) | Final Conc. (Wt.%) | Time (days) |
|---|---|---|---|
| Polyacrylamidesulfate | 5 | 45 | 2 |

EXAMPLE 4

Two agitated thickeners provided with slowly rotating agitators (0.5 rpm) were used for a large scale study of the settling behavior of slimes. The bottom third of one thickener was filled with graded sand for final dewatering, while the other was used for the initial thickening. A run was made using a situs prepared acrylamide sulfate flocculant in a total amount equivalent to 0.5 lb./ton slime solids. This run was made using 39,375 volumes of a phosphate slime of 8 percent solids content. In the first step the feed was mixed with 200 volumes of a 0.1 percent solution of the flocculant and left overnight to settle. A total of 23,000 volumes of supernatent liquid was collected, leaving an underflow containing 19 percent solids. Two additional 200 volume portions of 0.1 percent flocculant were added to the slime in the thickener. Within 24 hours, an overflow of 3,500 volumes was collected. The thickened slime, containing over 25 percent solids, was then mixed with 150 volumes, of 0.1 percent flocculant and transferred to the second thickener which was lined with a sand bottom. After 16 hours, the solids content reached 38.6 percent and after a 24-hour duration in excess of 40 percent.

EXAMPLE 5

A 1,000 volumes potash slime was contacted with 40 volumes of a 0.10 percent solution of the acrylamide sulfate flocculant using stagewise addition in increments of 10 volumes each. The first 10 volumes showed no apparent change. With the addition of 20 volumes of the flocculant the slurry began to show signs of becoming particulate, which slowly disappeared. The next 20 volumes of the flocculant brought a complete change in the character of the slurry. Instead of the colloidal characteristics the slurry was very particulate with individual particles easily distinguishable.

EXAMPLE 6

A potash slime, which was colloidal in nature and could not be settled or effectively filtered, was treated. Seventy volumes of approximately 28 percent solids by weight was diluted with 500 volumes of water. This mixture was slurried for 5 minutes. Six volumes of a 1 percent situs prepared acrylamide sulfate aqueous flocculant solution was added drop-wise to the slurry. The flocculation was almost instantaneous. This amount of flocculant gave large agglomerate floccules.

EXAMPLE 7

Seventy volumes of a slime was combined with 80 volumes of a potash brine, which was the end liquor from a potash flotation. Filtration experiments were carried out on this flocculated slurry and untreated slurry. The untreated slurry, which was virtually impossible to filter, filtered very fast and completely in a matter of minutes after addition of the flocculant. The flocculated slimes retained in the liquor were found to be about 10 to 15 percent as compared to 250 percent in the untreated slimes.

EXAMPLES 8 to 11

Several monomer systems were directly polymerized in an aqueous media to form their corresponding polyelectrolyte reaction masses. Each was evaluated by determining the subsidence rate of a slurry. In each instance to 200 volumes of a phosphate slime containing 5 percent solids there was added 1.25 volumes of a 0.1 percent flocculant solution obtained by the direct in situ polymerization of the monomeric constituents.

TABLE IV

| Example | Polyelectrolyte Monomer Content (Mole %) | Slurry Vol. ½ | ½ | After the Hrs. 1 | 24 |
|---------|------------------------------------------|---------------|-----|------------------|-----|
| 8 | 100% Acrylamide | 174 | 158 | 99 | 70 |
| 9 | 80% Acrylamide 20% Maleic Anhydride | 140 | 111 | 99 | 70 |
| 10 | 95% Acrylamide 5% Diacetone Alcohol | 185 | — | — | 65 |
| 11 | 65% Acrylamide 35% Acrylic Acid | 114 | 94 | 83 | 58 |
| Control | none | 198 | 197 | 196 | 146 |

EXAMPLE 12

A municipal sewerage waste having a turbidity of 110 (equivalent ppm of colloidal silica) was treated with the aqueous reaction mass directly obtained by the polymerization of ethyleneimine to yield an aqueous solution containing 0.1 percent polyethyleneimine. A 2 volume sample of the polyelectrolyte was added to 500 volumes of the sewer sample. Turbidity reduced to 52 within an hour.

EXAMPLE 13

A phosphate slime settled to approximately 15 weight percent solids was pumped to a settling zone. Simultaneously, tailing sand was mixed with the thickened slimes. The mixture rapidly dewatered to 35–60 weight percent solids on a sand free basis. In settling, segregation of sand from phosphate clay did not occur. Instead the sand was uniformly distributed throughout the clay. When dry, the mixture was porous and suitable for pasture land.

EXAMPLE 14

A phosphate slime containing about 1.8 percent solids was treated with a coagulant reaction mass containing as the flocculating agent a copolymer of acrylamide sulfate and maleic anhydride. The flocculating agent was mixed into one slime sample with gentle agitation and in another with a high shear agitation for 10 minutes. The results are shown in Table V.

TABLE V

| Time, Min. | Gentle Mixing | High Shear |
|------------|---------------|------------|
| | Wt. % Settled solids | |
| 0 | 1.8 | 1.8 |
| 20 | 2.0 | 2.0 |
| 60 | 2.25 | 2.95 |
| 90 | 2.60 | 3.80 |
| 120 | 3.30 | 4.95 |
| 180 | 4.10 | 5.20 |
| 240 | 4.85 | 5.95 |
| 320 | 5.70 | 6.65 |

EXAMPLE 15

Several phosphate slimes samples were treated with commercial flocculant and an in situ prepared liquid coagulant reaction mass containing, as the coagulant, a copolymer of the acrylamide sulfate and maleic anhydride.

Gypsum was incorporated in sufficient amount to make a saturated solution. Degree of compaction with and without gypsum is shown in Table VI.

TABLE VI

| | No Gypsum | | | Gypsum | | |
|---|---|---|---|---|---|---|
| | Wt. % Settled solids | | | | | |
| Time, (hrs.) | 0 | 2 | 24 | 0 | 2 | 24 |
| Commercial Flocculant | 2.4 | 2.8 | 3.6 | 2.4 | 2.8 | 3.6 |
| Liquid Acrylamide sulfate-maleic anhydride reaction mass | 2.4 | 3.7 | 4.0 | 2.4 | 5.9 | 6.3 |

What is claimed is:

1. A process for separation of solids from an aqueous liquid suspension which comprises:
    a. adding to a liquid suspension, with agitation, a compatible liquid coagulant reaction mass comprising a liquid and a water soluble polyelectrolyte coagulant formed in situ in said liquid by the direct vinyl polymerization of a polymerizable amount of at least one unsaturated monomer in the presence of a suitable polymerization catalyst therefore, said liquid coagulant reaction mass being used as such without recovery of the formed coagulant from said liquid in at least one flocculation stage in an amount at least sufficient to initiate the formation of floccules of the solids;
    b. settling the flocullated solids with slow agitation to form at least a partially compacted solids and a clarified liquid;
    c. separating a clarified liquid from the partially compacted solids.

2. A process as claimed in claim 1 in which the liquid coagulant reaction mass is added to the liquid suspension with high shear agitation.

3. A process as claimed in claim 1 in which the liquid coagulant reaction mass is added to the liquid suspension in at least two flocculation stages with intermediate settling of the flocculated solids, with agitation, between additions of the liquid coagulant reaction mass.

4. A process as claimed in claim 1 in which the coagulant is added to the liquid suspension in a total amount of from about 10 to about 1,000 parts per million parts particulate solids.

5. A process as claimed in claim 1 in which the water soluble polyelectrolyte coagulant contains an interpolymerized amount of at least one vinyl carboxamide sulfate which undergoes vinyl polymerization.

6. A process as claimed in claim 1 in combination with the steps of:
   a. passing the partially compacted solids to a porous filter media;
   b. further compacting the flocculated solids by slowly agitating flocculated solids in contact with the porous filter media.

7. A process as claimed in claim 6 in which the porous filter media is a sand filter.

8. A process as claimed in claim 1 in combination with the steps of:
   a. admixing sand with the flocculated solids when said flocculated solids are at least at a solids concentration of ten percent by weight;
   b. passing flocculated solids-sand mixture to a porous filter media;
   c. further compacting the mixture in contact with the porous filter.

9. A process as claimed in claim 8 in which the porous filter media is sand filter.

10. A process as claimed in claim 8 in which sand is admixed with flocculated solids in an amount of from about 50 to about 150 percent by weight based on the weight of the flocculated solids.

11. A process as claimed in claim 8 in combination with passing the compacted mixture of solids and sand to a settling pond.

12. A process as claimed in claim 11 in which the settling pond is a sand bottom pond.

13. A process as claimed in claim 12 in which the sand bottom pond is equipped with drainage tiles.

14. A process as claimed in claim 1 in which the partially compacted solids are centrifuged to further compact the solids.

15. A process as claimed in claim 1 in combination with the steps of:
   a. admixing sand with the partially compacted flocculated solids when said partially compacted solids are at least at a solids concentration of at least ten percent by weight;
   b. passing the mixture of sand and flocculated solids to a settling pond.

16. A process as claimed in claim 15 in which the settling pond is a sand bottom pond.

17. A process as claimed in claim 16 in which the sand bottom pond is equipped with drainage tiles.

18. A process as claimed in claim 15 in which sand is added in an amount of from about 50 to 150 percent by weight based on the weight of the compacted flocculated solids.

19. A process as claimed in claim 6 in combination with the additional steps of:
   a. mixing the filtered compacted solids with sand;
   b. passing the combined mixture of compacted filtered solids and sand to a settling pond.

20. A process as claimed in claim 19 in which the settling pond is a sand bottom pond.

21. A process as claimed in claim 20 in which the sand bottom pond is equipped with drainage tiles.

22. A process as claimed in claim 6 in which the compacted solids are scraped from the surface of the porous filter media while compacting solids are agitated.

23. A process as claimed in claim 1 in which the liquid suspension is sewage.

24. A process as claimed in claim 1 in which the liquid suspension is an industrial waste.

25. A process as claimed in claim 1 in which the liquid suspension is a slime.

26. A process as claimed in claim 25 in which the slime is a phosphate slime.

27. A process as claimed in claim 26 in which gypsum is added with the liquid coagulant reaction mass to the phosphate slime in the flocculation stage in an amount of from solution saturation to one percent in excess of solution saturation.

* * * * *